Patented July 22, 1952

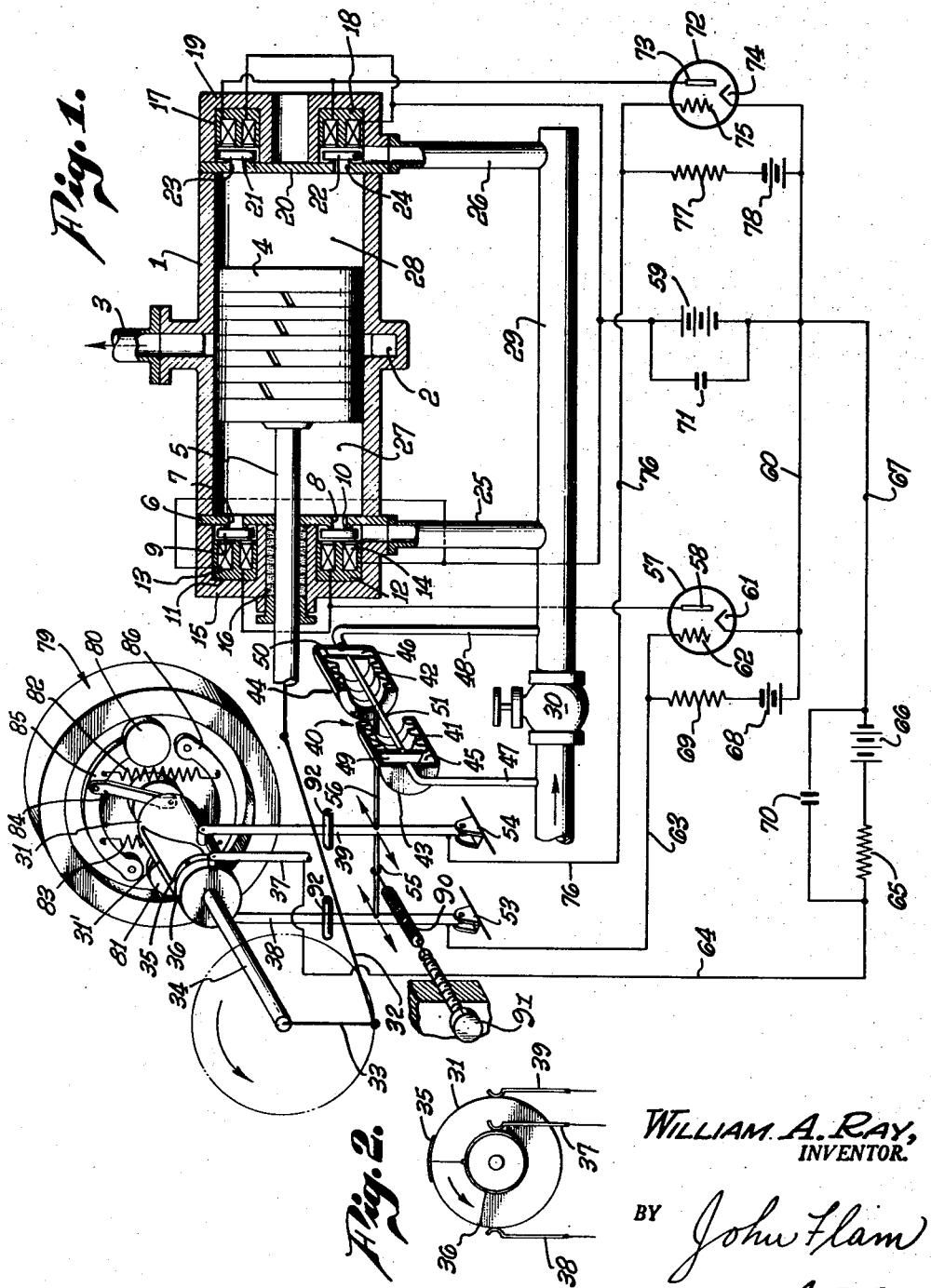

2,604,079

UNITED STATES PATENT OFFICE 2,604,079

HEAT ENGINE HAVING AN ELECTRICALLY ACTUATED VALVE MECHANISM

William A. Ray, North Hollywood, Calif.

Application May 7, 1945, Serial No. 592,421

20 Claims. (Cl. 121—148)

This invention relates to heat engines utilizing an elastic fluid medium, such as steam.

Steam engines adapted to operate a substantially steady load, or one that is moderately variable, have been designed to perform satisfactorily. However, where the load is such that rapid fluctuations in speed and torque occur, it is necessary specially to consider the characteristics of such engines. Loads of this fluctuating type are encountered in the operation of motor vehicles, such as passenger cars, coaches, busses, and trucks.

In the past, vehicles of this character have been driven generally by prime movers that are best adapted to operate at speeds and torques that do not vary greatly, such as gasoline or diesel engines; hence the necessity for providing expensive and complex mechanisms for varying the rates of transmission. Steam engines have also been utilized to a limited extent for driving such vehicles, but their general efficiency has been low due to the employment of manually adjustable cut-off means to alter the expansion ratio of the steam in accordance with variations in the load requirements.

It is one of the objects of this invention to make it possible effectively to provide an elastic fluid engine (such as a steam engine) that can satisfactorily propel a motor vehicle, and that obviates the necessity for such ratio changing gears or devices.

The invention more particularly relates to a reciprocating engine employing a cylinder and piston, with a valve system for admitting and discharging steam from the cylinder; and, further, to one that is characterized by the use of high steam pressures of from 500 to 1500 pounds per square inch, and to one, also, that is adapted to operate between wire speed and torque variations.

The operation of such engines is a function of the points of admission and cut-off of the steam into the cylinder or cylinders, as well as of the point at which exhaust is effective. Ordinarily, the point of admission is preferably slightly ahead of the completion of a prior stroke; that is, there is a "lead." The interval between admission and cut-off determines the amount of steam that passes into the cylinder; and the point of cut-off determines the extent of expansion prior to exhaust. Obviously, the greater the expansion, the less the mechanical energy developed in a cycle, corresponding to a reduction in power.

Accordingly, the performance of the engine may be controlled by adjusting the amount of lead, as well as the point of cut-off, without material throttling of the steam pressure.

It is another object of this invention to make it possible to adapt this method of control to an engine operating for at least a part of the time, at high speeds, as demanded in an automotive vehicle.

In order to accomplish these results, the present invention contemplates the use of electromagnetically operated valves, and especially for the admission of steam to the cylinder. In this way, by appropriate circuit design, the valves can be operated very rapidly. Such valves have additional advantages. Thus, when the piston is at its extreme position adjacent a cylinder head, the "clearance" or volume of the resultant cylinder space can be kept very low, since such valves do not require pockets or other space wasting devices.

It is accordingly another object of this invention to make it possible to operate the valves of a reciprocating steam engine by the aid of electromagnets.

It is still another object of this invention to make it possible to cut off the admission of steam at any point in the reciprocating motion of the piston, no matter how close it may be to the point of admission. In this way, very high expansion ratios and attendant increased heat efficiency are attainable.

There are conditions of operation of an automobile, as during coasting, that require little power, whether the vehicle be operating at either a low speed or a high speed. It is another object of this invention to ensure that the electromagnetically operated valves will function rapidly enough to control the admission or cut-off of the steam at any speed, and particularly to provide a sufficiently rapid cut-off to ensure against "wire drawing" or throttling of the steam by the valve, even though the engine is operating at a high speed and the point of cut-off is but a very small per cent of the engine stroke.

The operation of a throttle valve is utilized in this instance to control the engine. It is another object of this invention to make it possible to vary the engine performance throughout a large range of speed and torque by the aid of a relatively small pressure drop across the throttle, say of the order of fifty pounds per square inch, where the boiler pressure is about 800 to 1000 pounds per square inch.

Furthermore, the lead of the inlet valve or valves is automatically adjusted in accordance with the speed of the engine, so that, as the speed increases, the lead is also increased.

This invention possesses many other advantages, and has other objects which may be made more clearly apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a diagrammatic representation of an engine and its control system, incorporating the invention; and Figure 2 is a diagram of the circuit controller forming a part of the engine.

In the present instance, a uni-flow engine is illustrated in which there is a cylinder 1 provided with a central annular exhaust passage 2 connected appropriately to an exhaust pipe 3.

Each end of the cylinder 1 is provided with a cylinder head and valves for admitting steam in a cyclic manner to either end of the cylinder 1, and thereby operating the reciprocating piston structure 4. This piston structure 4 is illustrated in Figure 1 in an intermediate position, traveling toward the right.

The piston structure 4 is connected with a stem 5 that may be appropriately arranged through mechanical connections to drive a load, such as an automobile or other vehicle, at varying speeds and torques.

The left-hand cylinder head includes a valve plate 6 in which are located a number of ports or valve openings 7, 8, etc. These ports or openings are located symmetrically in annular fashion around the axis of the cylinder 1, and as many of them as convenient are provided. They are intended to be controlled by the valve closure members 9, 10, etc. These members are adapted to seat on narrow valve seats disposed around each opening. By this arrangement a large flow of steam is permitted, uniformly distributed around the axis of piston structure 4. The uniformity thus attained ensures that the temperature differentials along the axis of the cylinder 1 are also substantially uniform. Furthermore, each closure is located exteriorly of the cylinder space.

Each of the closure members 9, 10, etc. is preferably made of magnetic material adapted to be magnetically attracted for opening the ports 7, 8, etc. by the aid of electromagnets 11, 12, etc. These electromagnets are energized by the aid of the coils 13, 14, etc., one for each closure. The electromagnets are shown as supported in an annular recess formed in a cover 15 through which the stem 5 extends. Each of the electromagnets 11, 12, etc. is provided with a small core around which the coils 13, 14 respectively may be disposed. Appropriate packing 16 may be provided around the stem 5, where the stem extends through the cover 15.

At the right-hand end of the cylinder 1, similar electromagnetic structures 17, 18, etc. are provided and supported in a cover member 19 adjacent the cylinder head valve plate 20. In this instance, the valve closures 21, 22, etc. cooperate with the admission ports 23, 24, etc.

Each of the closures 9, 10, 21, 22, etc. is urged against its respective seat by the pressure of the steam until the electromagnets 11, 12, 17, 18, etc. are energized to lift the valve closure members from their seats. If desired, suitable spring means may be provided for urging each of the closures 9, 10, 21, 22, etc. toward its seat, supplementing the steam pressure for this purpose.

Steam is transmitted through the conduits 25, 26, to spaces exterior of the cylinder chambers 27 and 28, and to the inlet side of the valve openings. Thus, the conduit 25 leads to the space formed by the valve plate 6 and cover member 15. Similarly, conduit 26 leads to the space between the valve plate 20 and the cover member 19. Both the conduits 25 and 26 are branched from the main steam supply line 29.

In operating the engine, steam is alternately admitted in proper sequence from the conduits 25 and 26 by appropriate cyclic energization of the electromagnets 11, 12, etc., and 17, 18, etc.

The steam, in passing through the conduit 25 and ports 7 and 8, makes but one turn, and its velocity head, prior to its entry into space 27, is not reduced appreciably. Uniform pressure is assured on the adjacent surface of the piston structure 4, and a uniform temperature gradient is obtained from the inlet ports to the exhaust port 2. The same considerations apply to the transmission of steam to the cylinder space 28.

In the position shown, the piston 4 is moving toward the right, the steam in chamber 27 expanding, since the valves 9, 10, etc. are closed, the piston being past the cut-off point. The piston 4 will continue to the right-hand end of its stroke, the left-hand end of the piston 4 uncovering the exhaust port 2 just before the piston reaches the end of its stroke. At the end of the stroke, the right-hand face of the piston 4 will be very close to the valve plate 20.

At about the time the piston 4 reaches the end of its stroke, the valve closures 21, 22, etc. are unseated, admitting steam to chamber 28 to urge the piston 4 toward the left. The closures 21, 22 seat when the piston 4 reaches the point of cut-off, steam in chamber 28 expanding until the right-hand edge of the piston uncovers the exhaust port 2 as the piston nears the left-hand end of its stroke. At the end of the stroke, the left-hand face of the piston is closely adjacent the plate 6; and, at about this time, the valves 9, 10, etc. unseat, admitting steam to chamber 27 for a new cycle of operation.

The valve closures 9, 10, 21, 22, etc., may be provided with a small amount of lead, permitting steam to enter the respective chambers 27 and 28 prior to the completion of the piston stroke. This lead is preferably adjustable, as will be explained hereinafter. Furthermore, the point of cut-off and lead is to some extent under the control of the operator, and the engine performance is also a function of this cut-off point.

By providing electromagnetically operated inlet valves, the closures of which are disposed exteriorly of chamber 27 and 28, it is possible to reduce the clearance to a small amount; that is, the volume of the cylinder space may be reduced to a very small value, at the point in the cycle where the piston is at the end of its stroke. This is possible because there are no valve pockets in which steam is permitted to enter. The clearance, in fact, can be reduced to a degree approaching that which is just sufficient to provide mechanical tolerance between the end faces of the piston structure 4 and the cooperating surfaces of valve plates 6 and 20. Clearances of less than 1% may be easily obtained by this means.

In order to control the engine, use is made of a throttle valve 30 which is arranged in conduit 29. This throttle valve is intended to be operated by manual pressure, such as by the aid of a foot pedal in a vehicle. A relatively minor pressure drop across the valve 30 is sufficient to control the operation of the engine over a wide range. For example, if the pressure to left of the valve 30 is of the order of 1000 pounds, a drop from 15 to 50 pounds across the valve 30 is all that is required to adjust the engine throughout its entire range. This is possible since the performance of the engine is effected, not by throttling, but by adjusting the point of cut-off. The control of the throttle valve 30 is made to determine this point, which may come very close to the point of admission when only low power requirements are needed. On the other hand, the point of cut-off may come later on in the cycle, permitting more steam to enter, with consequent reduced expansion. This corresponds to a greater power demand.

The cut-off may take place after a very short interval of admission; in fact, by the aid of the control devices to be hereinafter described, extremely high expansion can be effected, cut-off taking place at a point corresponding to a fraction of one per cent after the beginning of the cycle.

The circuit controller for the energization of the electromagnets 11, 12, 17 and 18, etc., includes a drum 31 which is driven in synchronism with the engine, as by the aid of a connecting rod 32, a crank 33, and a mandrel or shaft 34 upon which the drum 31 is mounted.

The drum 31 carries a triangular conducting segment 35. This segment is shown as electrically connected with a collector ring 36, also mounted on the drum, and which is in continuous contact with a brush structure 37. The drum 31 is shown as rotating in a counterclockwise direction, and the segment 35 is arranged alternately to contact brush structures 38 and 39.

Brush structures 37, 38, and 39 may be of any suitable type, in which a contact, such as a carbon brush, is spring-pressed against the periphery of the drum 31.

Triangular segment 35 is so placed on drum 31 that one of its longer sides 31' is parallel to the axis of rotation. The segment narrows toward the right, as viewed in Figure 1. Accordingly, adjustment of brush structures 38 and 39 in an axial direction determines the interval that these brushes stay in contact with the segment 35. The farther the brushes 38 and 39 are moved in a direction toward the right, as viewed in Figure 1, the shorter the interval of contact becomes. This interval of contact corresponds to the period of admission, and the shorter it is, the closer does cut-off approach the point of admission.

Control of the brush structures 38 and 39 is effected in response to the difference in pressure on opposite sides of the throttle valve 30. The greater the difference in pressure, the farther are brush structures 38 and 39 urged toward the right, and the point of cut-off approaches closer and closer to the point of admission. This corresponds to a desire on the part of the operator to reduce the power of the engine. However, in the event the valve 30 is entirely open, when maximum power is required, the brush structures 38 and 39 are moved toward the left to increase the interval of admission.

This result is obtained by the aid of the pressure responsive mechanism 40. This may include, for example, a pair of metal bellows 41 and 42. The exterior of the bellows defines, with housings 43 and 44, pressure chambers 45 and 46. Pressure chamber 45 is in communication with the inlet side of valve 30, as by the aid of the conduit 47. Pressure chamber 46 is in communication with the outlet side of the valve 30, as by the aid of conduit 48. The inside surfaces of the bellows 41 and 42 are exposed to atmosphere. The adjacent ends of the bellows are fixed to appropriate flanges on the housings 43 and 44. The movable end walls 49 and 50 of the bellows 41 and 42 are joined by a rod 51. The position of the rod 51 is determined by the differential in the pressures existing in chambers 45 and 46. Chamber 45 has a pressure preponderating over that in chamber 46. As the pressure drop across throttle valve 30 increases, the rod 51 is urged toward the right. As the pressure drop decreases, the rod 51 is permitted to move toward the left.

This movement of rod 51 is utilized to move the brush structures 38 and 39 in a corresponding direction. For this purpose, these structures 38 and 39 are shown as pivotally mounted respectively in standards 53 and 54 so that they may be swung about axes spaced considerably below the axis of shaft 34. Rod 51 is connected to the brush structures 38, 39 by the aid of the connections 55 and 56.

Assuming that power requirements are low, the pressure drop across throttle valve 30 is increased, the valve approaching a fully closed position. The brush structures 38, 39 move toward the right, and the cut-off is caused to take place at a point close to the point of admission. This can occur, for example, while coasting or while going downhill, regardless of whether the engine is operating at a relatively high speed, or at a low speed.

This adjustment of the cut-off in turn has an effect upon the pressure drop across valve 30. The earlier the cut-off takes place, the less is the pressure permitted to drop. Accordingly, there is an equilibrium established between the point of cut-off and the pressure drop across the valve 30 to suit the particular requirements of the load.

It is desirable that the brush structures 38 and 39 be biased toward late cut-off position. This not only ensures that the engine will start under conditions of a limited expansion ratio ensuring adequate starting torque, but also properly positions the brushes under conditions of heavy loading, with the valve 30 fully open when the pressures in the chambers 45 and 46 may be equal. For this purpose a light spring 90 is adjustably tensioned between an anchor screw 91 and the connecting bar 55. The spring 90 urges the brush structures 38 and 39 to the left in Fig. 1 under conditions of substantial equilibrium of pressures in the chambers 45 and 46, a suitable stop 92 being provided to limit such movement of the brush structures. Upon existence of a sufficient excess of pressure in chamber 45 over that in chamber 46, structures 38 and 39 are moved to the right against the force exerted by the spring 90 to advance the point of cut-off. Adjustment of the screw 91 serves to alter the tension of the spring 90 and thus adjust the point of cut-off for a given pressure differential between the chambers 45 and 46.

The segment 35, as heretofore stated, alternately contacts brush structures 38 and 39, causing energization of electromagnets 11, 12, etc., and subsequent energization of electromagnets 17, 18, etc. This energization is effected very rapidly, so that the valve closures are opened in a sufficiently short interval even when the engine is operating at relatively high speeds, of the order of one or two thousand revolutions per minute.

The electric circuits whereby this fast operation may be accomplished are diagrammatically illustrated in Figure 1.

Thus, the coils 13, 14, etc., controlling the valves at the left-hand side of the cylinder 1 are shown as supplied with current from the output circuit of the electronic emission device 57. This output circuit is permitted to pass current only while segment 35 is in contact with brush structure 38. The output circuit includes plate or anode 58, coils 11, 12, etc., and a source of direct current, such as the battery 59, connection 60, to the cathode or filament 61. The space current between the filament 61 and the plate 58 is controlled by the control electrode or grid 62. This, in turn, is connected as by lead 63 to the brush structure 38. The input circuit, when the brush structure 38 is in contact with segment 35, can be traced as follows: grid 62, brush structure 38, segment 35, collector ring 36, brush structure 37, connection 64, resistance 65, a source of direct current energy, such as battery 66, and connections 67 and 60 to the cathode 61.

Normally, while the segment 35 and brush structure 38 are out of contact, a negative potential is impressed upon grid 62, preventing passage of any space current. This may be accomplished by the aid of the biasing battery 68 and the high grid resistance 69, which are connected across the input circuit. At the same time, a condenser 70 is being charged by the battery 66 through the resistance 65.

However, as soon as contact is made between segment 35 and brush structure 38, the condenser 70 discharges through these contacts and resistance 69 to increase the potential of the control electrode 62. This, in turn, instantaneously causes a heavy flow of current in the output circuit from the condenser 71 which had theretofore been charged by the battery 59. This heavy current persists but for a very short interval, and is followed by a normal steady flow from battery 59. The discharging current, although of very short duration, is sufficient instantaneously to cause attraction of the closure members 9, 10, etc., and the valves are opened. The steady current from battery 59 is sufficient to keep the closures in attracted position, and until segment 35 passes out of contact with brush structure 38. At that time the output circuit is deenergized, and the valves are permitted to close.

The use of a surge current from the condenser 71 is of great importance, as it causes very rapid operation of the valves. This current, in fact, is large enough to exceed substantially instantaneously the saturation requirements of the electromagnet structure.

The circuit is so designed, especially resistances 65, 69 and condensers 70, 71, that these condensers may be fully charged in the interval between successive establishment of contact between segment 35 and brush structure 38.

When segment 35 comes into contact with brush structure 39, the electronic emission device 72 operates in a similar manner to energize electromagnet structures 17, 18, etc. Thus, the output circuit, as before, can be traced from the plate or anode 73, electromagnet structures 17, 18, battery 59 and condenser 71 in parallel, to the cathode or filament 74. The current through this output circuit has an instantaneously high value as before. The control electrode 75 is so connected that its potential is raised just as soon as brush structure 39 is in contact with segment 35. The input circuit thus includes control electrode 75, connection 76, brush structure 39, segment 35, collector ring 36, brush structure 37, connection 64, condenser 70 in parallel with resistance 65 and battery 66, connection 67, to cathode 74. The condenser 70, having been previously charged, serves to raise the potential of grid 75 sufficiently to cause operation of the output circuit. As before, a resistance 77 and a biasing battery 78 may be bridged across the input circuit to render the device 72 inactive between the intervals of contact between segment 35 and brush structure 39.

The shape of segment 35 may be made as desired, to determine the inter-relationship between the pressure differential across the throttle valve 30 and the point of cut-off of the admission valves.

Another function important in the operation of the engine is the "lead," or period that the inlet valves are open prior to the end of the stroke of the piston structure 4. This lead adjustment is preferably independent of the period of admission. For operation at high speeds, the lead should be increased, not only to provide a proper cushion for the movement of the piston structure, but also to get the steam into the cylinder at the right time to be used most efficiently.

This lead is adjustable in the present instance by relative angular adjustment of drum 31 on its shaft 34 in response to speed variations. At high speeds, the drum 31 is angularly adjusted in a counter-clockwise direction to cause segment 35 to contact brush structures 38 and 39 at an earlier period or point than before.

This angular adjustment is provided by the aid of a speed responsive device 79. This device is mounted on the shaft 34 and is provided with centrifugal weights 80 and 81. These weights are located at the extremities of arms 85 and 86 pivotally mounted on the device 79. Springs 82 and 83 connect these arms and provide a force tending to draw the weights 80 and 81 inwardly. However, as the speed increases, the arms 85 and 86 separate and operate links 84 (only one of which is shown) connected to drum 31 for imparting an angular movement of drum 31 with respect to shaft 34.

For example, at high speeds and low torque requirements, such as when coasting or going downhill, the lead is automatically increased by the operation of the centrifugal device 79. Furthermore, the point of cut-off is advanced. Thus, very little steam is utilized in the cylinder chambers 27 and 28, due to the huge pressure drop across the throttle 30, which is nearly or entirely closed under such conditions. The steam expansion is greater and the efficiency of the engine is increased. However, as soon as the load requires a heavy torque, as during a period of acceleration or during progress up an incline, the throttle valve 30 is opened further, and the pressure drop across it is reduced. This brings the brush structures 38 and 39 to a position where the point of cut-off is delayed and a greater amount of steam is taken into the cylinder chambers at each cycle. The amount of expansion is considerably reduced.

In the event of excessive pressure in chamber 27 or 28, the valve closures 9, 19, 21, 22, etc., automatically unseat to relieve this pressure. No supplemental relief valve is necessary.

Since operation of the throttle valve 30 automatically causes a balance to be established between the point of cut-off and the quantity of steam passing the valve 30, the need of reducing gearing, or the like, to comply with the load requirements is entirely obviated.

The inventor claims:

1. In a heat engine having a cylinder and a reciprocating piston therein: one or more valves for controlling the admission of an elastic fluid medium to the cylinder through successive cycles; electromagnetic means for operating the valve or valves; and means operated in accordance with the speed of the engine to adjust the point of admission without altering the length of the period of admission.

2. In a heat engine having a cylinder and a reciprocating piston therein: one or more valves for controlling the admission of an elastic fluid medium to the cylinder; electromagnetic means for operating the valve or valves; a throttle valve for controlling the pressure of the medium passing to the said electromagnetically operated valve or valves; and means responsive to the pressure drop across the throttle valve for determining the point where said electromagnetically operated valve or valves close; and means controllable at will for adjusting said throttle valve.

3. In a heat engine having a cylinder and a reciprocating piston therein: one or more valves for controlling the admission of an elastic fluid medium to the cylinder; electromagnetic means for operating the valve or valves; means operated in accordance with the speed of the engine to adjust the point of admission; and means for controlling the length of the period in each cycle during which the valve or valves remain open.

4. In a heat engine having a cylinder and a reciprocating piston therein: one or more valves for controlling the admission of an elastic fluid medium to the cylinder; electromagnetic means for operating the valve or valves; a rotary drum, means connecting the drum to the engine; said drum having a circuit controlling segment thereon; a contact member cooperating with the drum, for cyclically energizing the electromagnetically operated valve or valves; and means adjusting the angular position of the drum with respect to said connecting means, and operating in accordance with the speed of the engine.

5. In a heat engine having a cylinder and a reciprocating piston therein: one or more valves for controlling the admission of an elastic fluid medium to the cylinder; electromagnetic means for operating the valve or valves; and means controlling the energization of said electromagnetic means, comprising: a conducting member movable in accordance with the movement of the piston; a cooperating contact member; one of said members being adjustable to vary the interval during which the members are in engagement; a throttle valve; and means responsive to the drop in pressure across the throttle valve to adjust said adjustable member; and means controllable at will for adjusting said throttle valve.

6. In a heat engine: a cylinder; a reciprocating piston therein; said cylinder having a head with a number of annularly arranged openings; closure members for said openings and arranged exteriorly of the cylinder chamber; and a series of electromagnets for respectively operating said closure members; and means for simultaneously energizing and deenergizing all of said electromagnets.

7. In a steam engine having one or more inlet valves for the admission of steam to a cylinder, and a piston movable in the cylinder; electromagnetic means for opening said inlet valve or valves; a circuit including a circuit controller operated in accordance with the movement of the piston, for energizing the electromagnetic means for the admission of steam; as well as a source of direct current and an energy storing device from said source for ensuring quick opening of the valve or valves by providing an initial increased flow of electrical energy to the electromagnetic means.

8. In a steam engine having one or more inlet valves for the admission of steam to a cylinder; and a piston movable in the cylinder; electromagnetic means for opening said inlet valve or valves; a circuit controller operated in accordance with the movement of the piston, for energizing the electromagnetic means for the admission of steam; and means ensuring quick opening of the valve or valves by providing an initial increased flow of electrical energy to the electromagnetic means, comprising a condenser; means charging the condenser during periods when the electromagnetic means is inactive; and means causing the condenser to discharge when the circuit controller is closed.

9. In a steam engine having a throttle valve, one or more inlet valves for the admission of steam to a cylinder, and a piston movable in the cylinder: means for adjusting the point of opening of the inlet valve or valves; and means operating in accordance with the speed of the engine for operating said adjusting means, without altering the length of the period of opening.

10. In a fluid pressure engine adapted to operate a load requiring variable speed and torque and having a controllable throttle valve as well as a valve for admitting fluid under pressure to the cylinder of the engine: means for determining the length of the period during which said fluid is admitted during each cycle; and means including a rotary mechanism operated by the engine to adjust said means in accordance with the pressure differential across the throttle valve, to decrease said period as the pressure differential is increased, and to increase said period as the pressure differential is decreased.

11. In a steam engine having one or more inlet valves for the admission of steam to a cylinder, and a piston movable in the cylinder; electromagnetic means for opening said inlet valve or valves; a circuit controller operated in accordance with the movement of the piston, for energizing the electromagnetic means for the admission of steam; and means ensuring quick opening of the valve or valves by providing an initial increased flow of electrical energy to the electromagnetic means, comprising an electronic emission device; said circuit controller controlling said device; and an output circuit for said device in which the electromagnetic means is included, said output circuit also including a condenser and a source of potential difference that charges the condenser during the period when the electronic emission device is inactive.

12. In a fluid pressure engine for driving loads requiring variable speed and torque: a cylinder; a piston in the cylinder; a valve for controlling the cyclic admission of fluid into the cylinder; a throttle valve for controlling the flow of fluid to the admission valve; said throttle valve being capable of adjustment for controlling the performance of the engine; and means including a rotary mechanism operated by the engine responsive to the pressure differential across the throttle valve for determining the period during which said admission valve is open during a cycle.

13. In a heat engine having a cylinder and a reciprocating piston therein: one or more valves for controlling the admission of an elastic fluid medium to the cylinder through successive cycles; electromagnetic means for operating a valve or valves; and means to adjust the point of admission without altering the length of the period of admission, including a pair of relatively angularly adjustable members; and means for rotating one of said members in accordance with the speed of the engine.

14. In a heat engine having a cylinder and a reciprocating piston therein: one or more valves for controlling the admission of an elastic fluid medium to the cylinder; electromagnetic means for operating the valve or valves; a throttle valve for controlling the pressure of the medium passing to the said electromagnetically operated valve or valves; means responsive to the pressure drop across the throttle valve for determining the point where said electromagnetically operated valve or valves close, and means to adjust the point of admission, including a pair of relatively angularly adjustable members; and means for rotating one of said members in accordance with the speed of the engine.

15. In a heat engine having a cylinder and a reciprocating piston therein: one or more valves for controlling the admission of an elastic fluid medium to the cylinder; electromagnetic means for operating the valve or valves; and means controlling the energizing of said electromagnetic means comprising: a conducting member rotated by the movement of the piston; a cooperating contact member; one of said members being adjustable to vary the interval during which the members are in engagement; a throttle valve; means responsive to the drop in pressure across the throttle valve to adjust said adjustable member; and means to adjust the point of admission of said valve or valves, comprising means for adjusting the angular position of the other member.

16. In a heat engine: a cylinder; a reciprocating piston therein; said cylinder having a head with a number of annularly arranged inlet openings therein; inlet valve members for said openings and arranged exteriorly of the cylinder chamber; a series of electromagnets, respectively for operating said inlet valve members individually; and means for simultaneously energizing and deenergizing all of said electromagnets.

17. In a heat engine: a cylinder; a reciprocating piston therein; said cylinder having a head with a number of annularly arranged inlet openings therein; inlet valve members for said openings and arranged exteriorly of the cylinder chamber; and a series of electromagnets, respectively for operating said inlet valve members individually; and circuit controlling means for energizing said electromagnets simultaneously.

18. In a steam engine having one or more inlet valves for the admission of steam to a cylinder, and a piston movable in the cylinder: means for adjusting the point of opening of the inlet valve or valves; and means operating automatically in accordance with an operating condition of the engine for operating said adjusting means without altering the length of the period of opening of said inlet valve or valves, including a pair of relatively angularly adjustable members; and means for rotating one of said members in accordance with the speed of the engine.

19. In a heat engine having a cylinder and a reciprocating piston therein: one or more valves for controlling the admission of an elastic fluid medium to the cylinder; electromagnetic means for operating the valve or valves; and means for adjusting the point of admission of the medium, comprising a pair of contact carrying members; one of said members being rotatable by the engine; and means for advancing and retarding the angular position of said rotatable member.

20. In a heat engine having a cylinder and a reciprocating piston therein: one or more valves for controlling the admission of an elastic fluid medium to the cylinder; electromagnetic means for operating the valve or valves; and means for adjusting the point of admission of the medium, comprising a pair of relatively angularly movable contact members; means for rotating one of said members in accordance with the movement of the piston; and means responsive to the speed of the engine for imparting an increment of angular movement to one of said members.

WILLIAM A. RAY.

REFERENCES CITED

The following references are of record in the file of this patent:

UNITED STATES PATENTS

| Number | Name | Date |
| --- | --- | --- |
| 281,579 | Storer | July 17, 1883 |
| 525,005 | Decombe et al. | Aug. 28, 1894 |
| 623,821 | Payne | Apr. 25, 1899 |
| 625,792 | Naylor | May 30, 1899 |
| 694,547 | Hood | Mar. 4, 1902 |
| 855,892 | Kendal | June 4, 1907 |
| 1,042,534 | Dawley | Oct. 29, 1912 |
| 1,125,204 | Stevens | Jan. 19, 1915 |
| 1,445,794 | Osbourn | Feb. 20, 1923 |
| 1,527,678 | Farquhar | Feb. 24, 1925 |
| 2,289,203 | McGrew | July 7, 1942 |
| 2,362,744 | Culbertson | Nov. 14, 1944 |

FOREIGN PATENTS

| Number | Country | Date |
| --- | --- | --- |
| 421,029 | Germany | Nov. 4, 1925 |